Jan. 2, 1968    T. F. BELL ETAL    3,361,321
METHOD AND APPARATUS FOR SOLDERING AND THE LIKE
Filed July 28, 1965    7 Sheets-Sheet 6
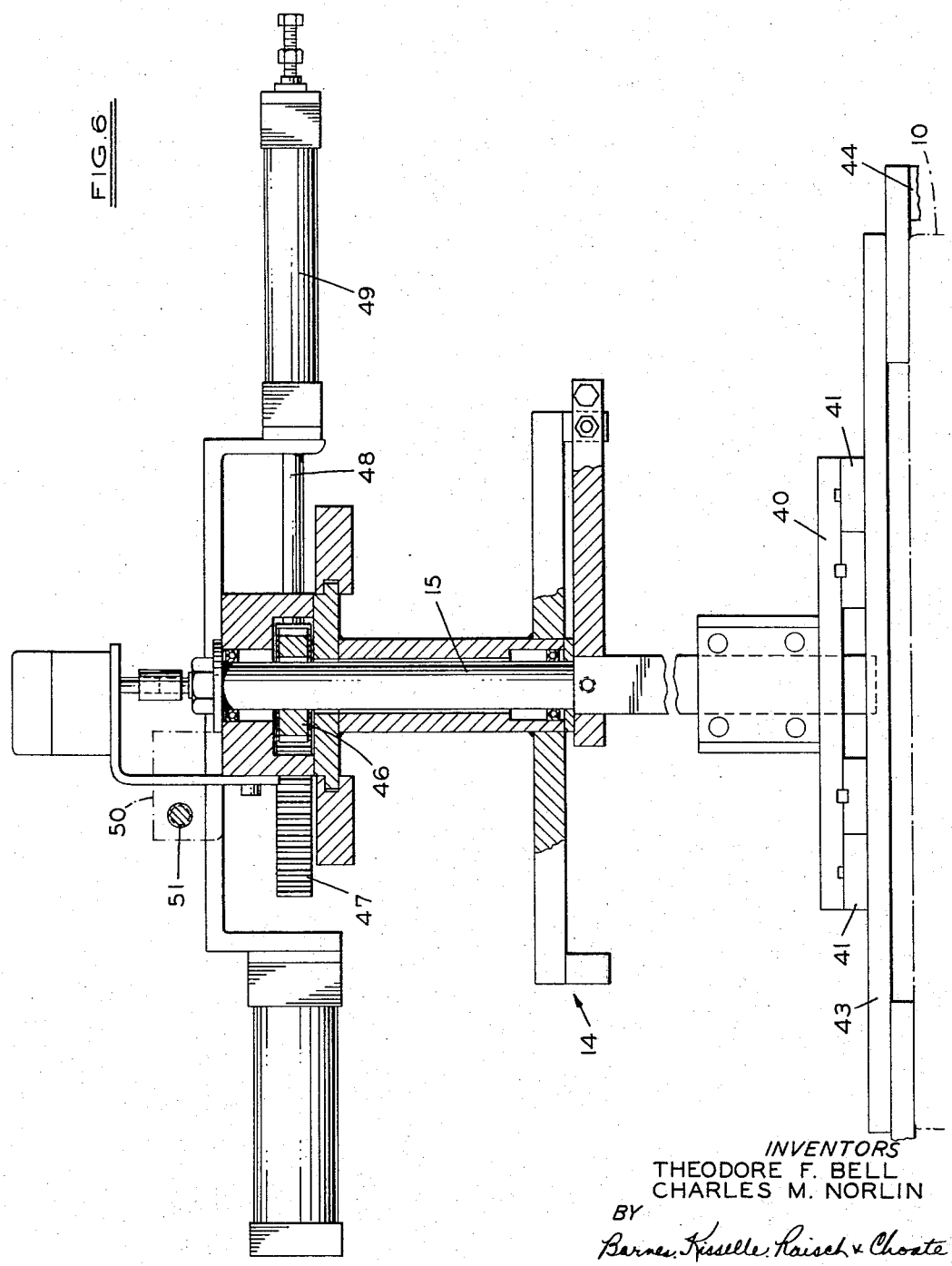
INVENTORS
THEODORE F. BELL
CHARLES M. NORLIN
BY
Barnes, Kisselle, Raisch & Choate
ATTORNEYS

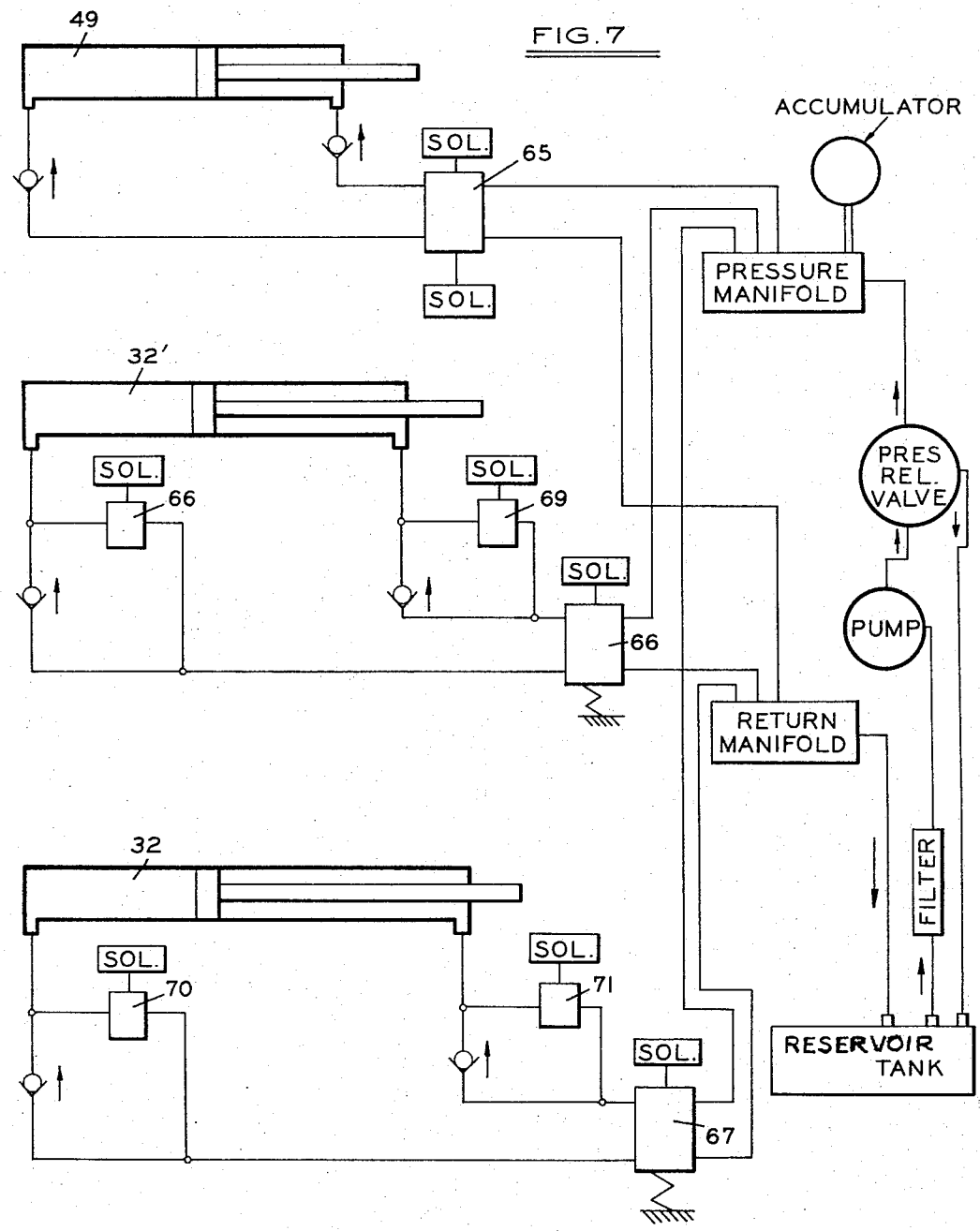

United States Patent Office 3,361,321
Patented Jan. 2, 1968

3,361,321
METHOD AND APPARATUS FOR SOLDERING
AND THE LIKE
Theodore F. Bell, 22813 Dequindre, Hazel Park, Mich.
48030, and Charles M. Norlin, Warren, Mich. (22813
Dequindre, Hazel Park, Mich. 48030)
Filed July 28, 1965, Ser. No. 475,517
16 Claims. (Cl. 228—43)

This invention relates to soldering or the like and particularly to a method and apparatus for soldering the top and bottom tanks on radiator cores.

In the manufacture of radiator cores, it has been conventional to clamp a radiator core in position, solder the tank to the core by manipulating a soldering torch and solder by hand, thereafter unclamping the radiator core and reclamping it in position for again soldering the second tank on the radiator. Obviously, such a method of manufacturing radiator cores is time consuming and also subject to the normal variations in the efficiency of soldering. It has also been heretofore suggested that a plurality of flames may be fed generally radially toward the radiator core through soldering increments around the periphery. This has not, however, resulted in a uniform soldering of the tanks to the core.

It is an object of this invention to provide a method and apparatus wherein the disadvantages of the prior method are eliminated; wherein a workpiece such as the radiator core has parts soldered thereto in a more efficient and less time consuming manner; and wherein the quality of the solder joint is improved.

It is a further object of the invention to provide a novel method and apparatus for soldering tanks to radiator cores.

It is a further object of the invention to provide such a method and apparatus wherein the variations in the shape of the part being soldered can be accommodated.

In the drawings:

FIG. 6 is a fragmentary sectional view taken along the line 6—6 in FIG. 5.

FIG. 7 is a schematic diagram of the hydraulic system.

Figure 1:
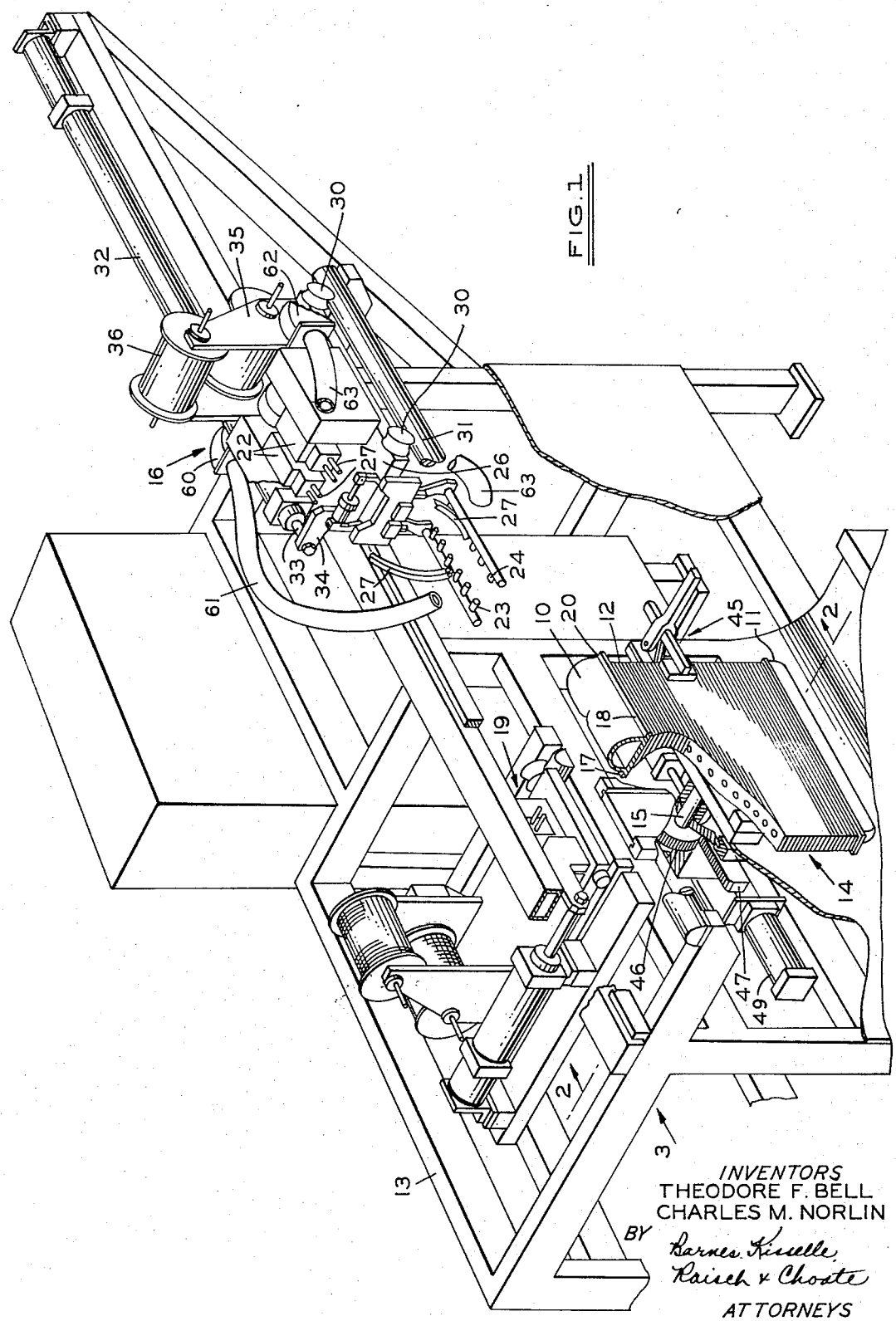
FIG. 1 is a fragmentary perspective view of an apparatus embodying the invention.

Referring to FIG. 1, the invention is directed to fixing the top and bottom tanks 10, 11 on the core 12 of a radiator. The apparatus comprises a frame 13 on which a work support 14 is positioned. The work support 14 is fixed on a shaft 15 which, in turn, is mounted for rotation about its axis on frame 13. By this arrangement, the core 12 can be supported and rotated into positions at 180 degrees to one another so that the upper tank 10 and the lower tank 11 can be successively soldered by the use of the same burner and solder feed apparatus, as presently described.

Referring to FIG. 1, a first carriage 16 is mounted on the frame 13 to bring burners and solder into position for joining the edges 17, 18 of the tank 10 to the core 12. Similarly, a second carriage 19, a portion of which is shown in FIG. 1, is mounted in position for movement on the frame 13 to join the transverse edges 20 of the tank 10 to the core 12. When the core 12 is rotated 180 degrees, the same carriages 16, 19 are moved to join the corresponding edges of the lower tank 11 to the core 12.

Figure 2:
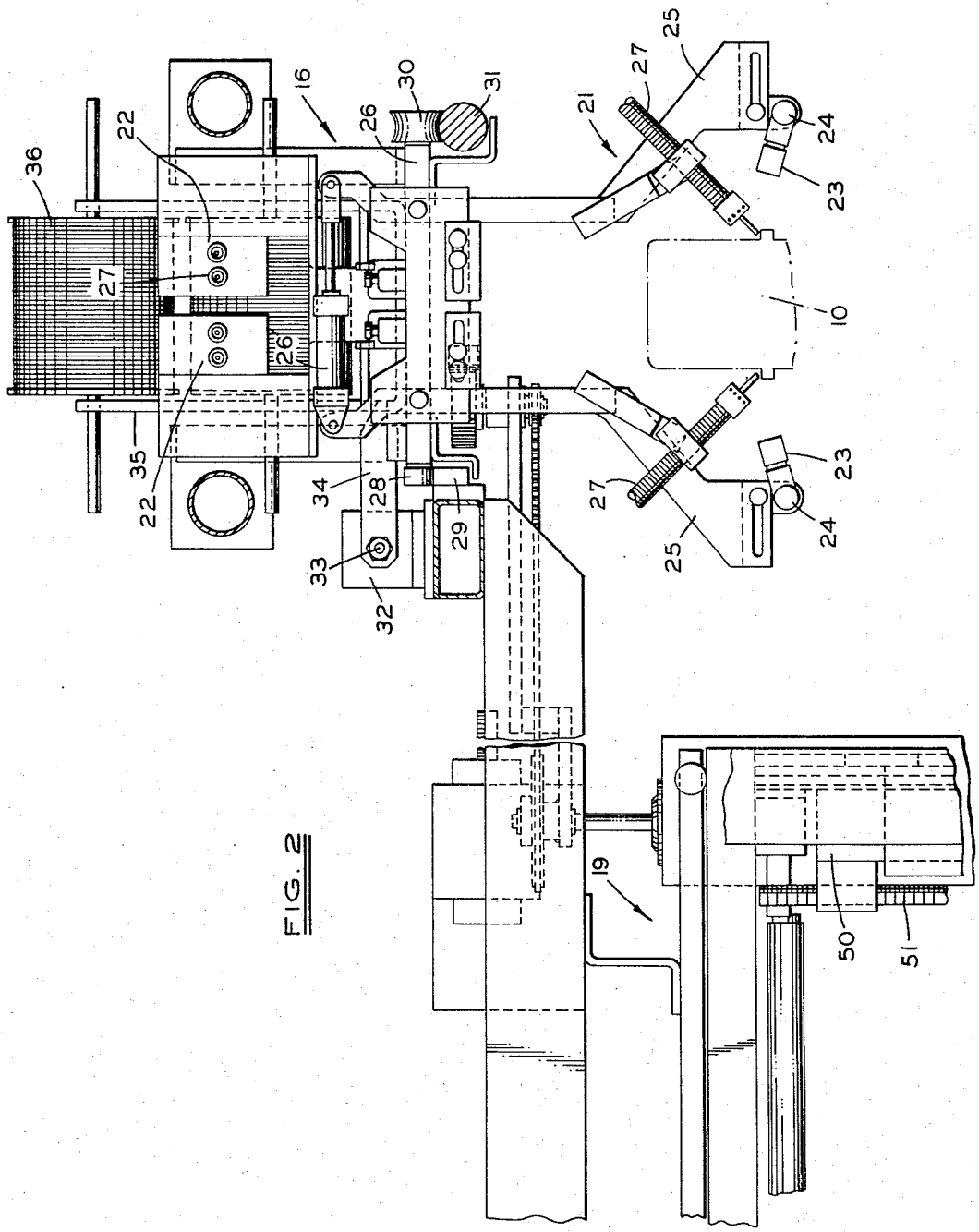
FIG. 2 is a fragmentary sectional view taken along the line 2—2 in FIG. 1.

Referring to FIG. 2, the first carriage 16 includes a burner assembly 21 and a plurality of solder feed assemblies 22. Each burner assembly 21 includes a plurality of nozzles 23 extending from headers 24 (FIG. 1) that form a bank of flames which supply heat to the edges 17, 18. Each header 24 is mounted on the lower end of an arm 25 that, in turn, is pivoted to the platform 26 of the carriage 16 (FIG. 2). The upper ends of the arms 25 are interconnected by a cylinder 26'. Application of fluid to the cylinder 26' moves the arms 25 inwardly and outwardly so that as the carriage is moved along the edges 17, 18, the arms 25 can be moved to accommodate projections on the tank 10 or core 12 thereby moving the flames inwardly and outwardly.

Each solder assembly 22 is adapted to feed solder incrementally through one or more solder feed tubes 27 to the work areas along the flame bank formed by the nozzles 23 so that solder is thereby fed to the areas of juncture 17, 18 of the tank 10 to the core 12.

As shown in FIG. 2, the platform 26 of the first carriage 16 has rollers 28 along one edge which engage a flat track 29 and grooved rollers 30 along the other edge which engage a cylindrical track 31. As further shown in FIG. 1, a cylinder 32 is mounted on the frame 13 and has the shaft 33 thereof connected by bracket 34 to the platform 26 to move the carriage 16 and, in turn, the burner assembly 21 and solder feed assemblies 22 along the areas of juncture of the tank 10 and core 12. The platform 26 also supports brackets 35 on which solder spools 36 are rotatably mounted. The solder feed assemblies draw the solder from the spools 36 and feed it through the tubes 27. Solder feed apparatus of the type shown is disclosed and claimed in our co-pending application, Ser. No. 363,256, filed Apr. 28, 1964.

As shown in FIG. 1, the second carriage 19 is substantially identical in construction to the first carriage 16. For purposes of clarity, the burner assemblies have been removed. The second carriage 19 includes one or more solder feed mechanisms and burner assemblies which are adapted to heat the sides 20 all of which are mounted on a carriage which is similar in construction and mounting as the first carriage 16 and is moved along the tracks by a cylinder in the same manner.

Figure 4:
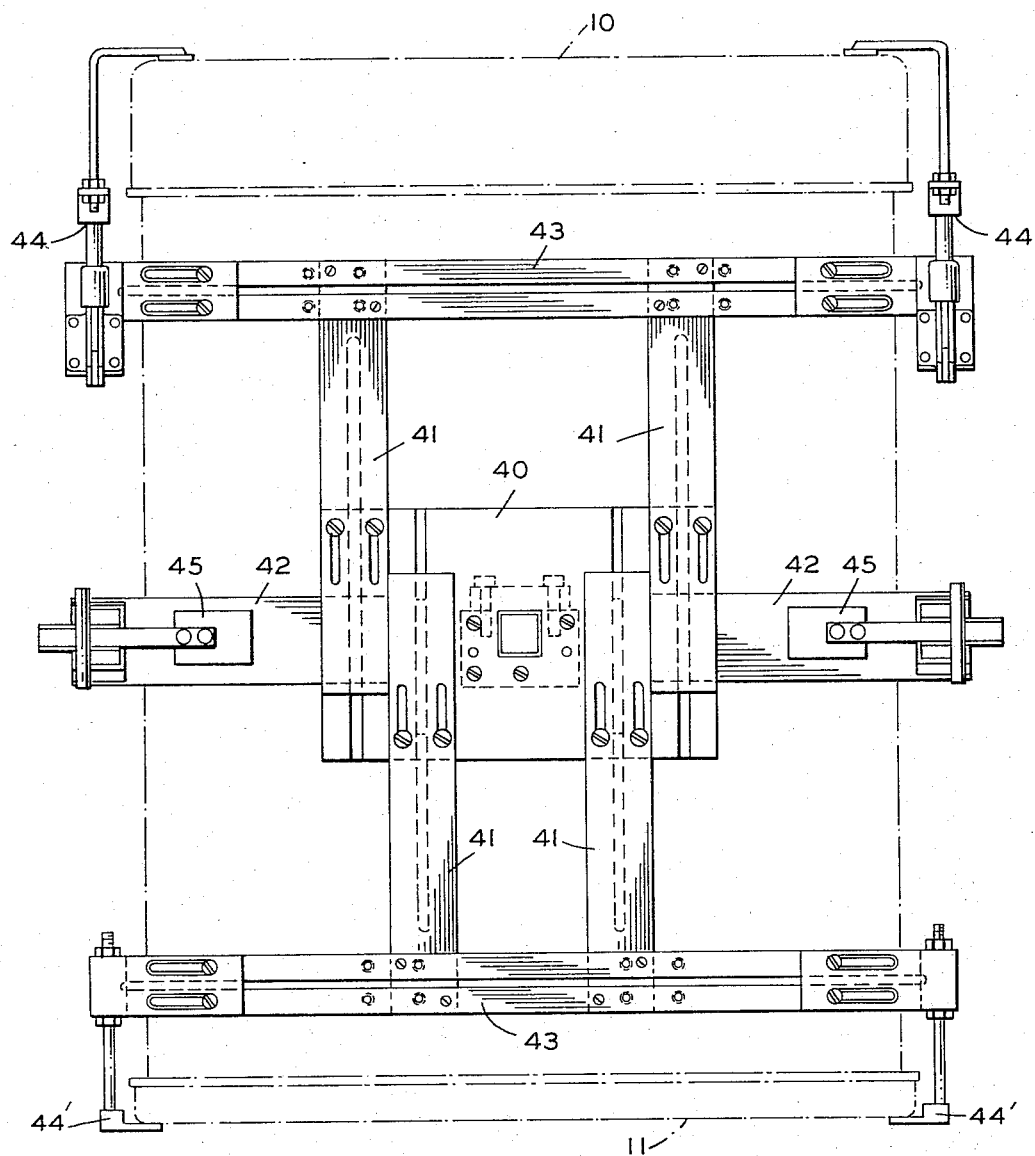
FIG. 4 is a side view of the work support taken along the line 4—4 in FIG. 3.
Figure 5:
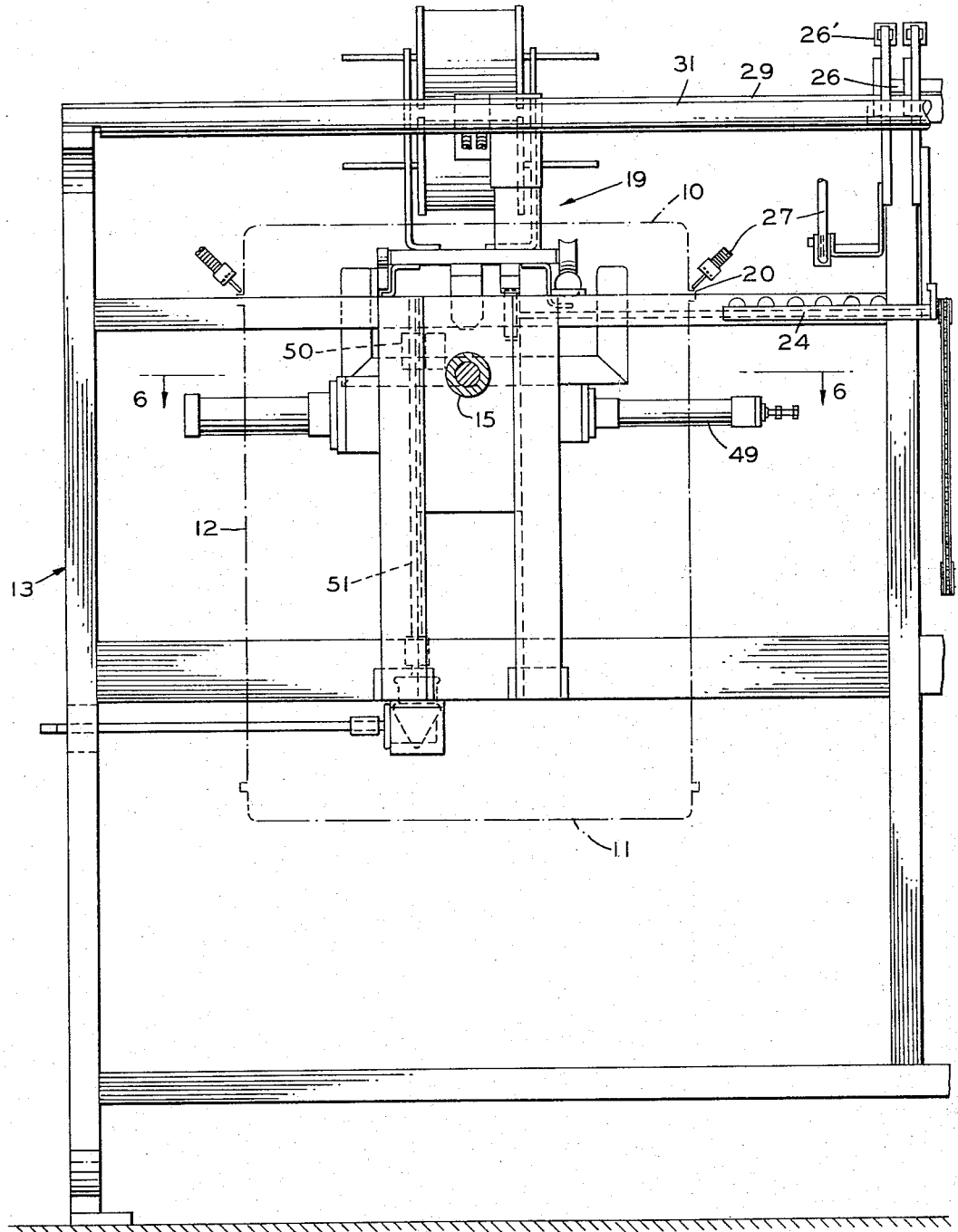
FIG. 5 is a fragmentary sectional view taken along the line 5—5 in FIG. 3.

Referring to FIG. 4, the work support mechanism 14 comprises a base plate 40 and a plurality of adjustable arms 41, 42. Toggle clamps 45 are mounted on the ends of the arms 42 and are adapted to press the core against the plate 40 and lock it in position. Transverse members 43 extend between the ends of the arms 41. The upper arm 43 has locating clamps 44 thereon which engage the upper end of the tank. Locating pads 44' are provided on the end of the lower arm 43.

Figure 3:
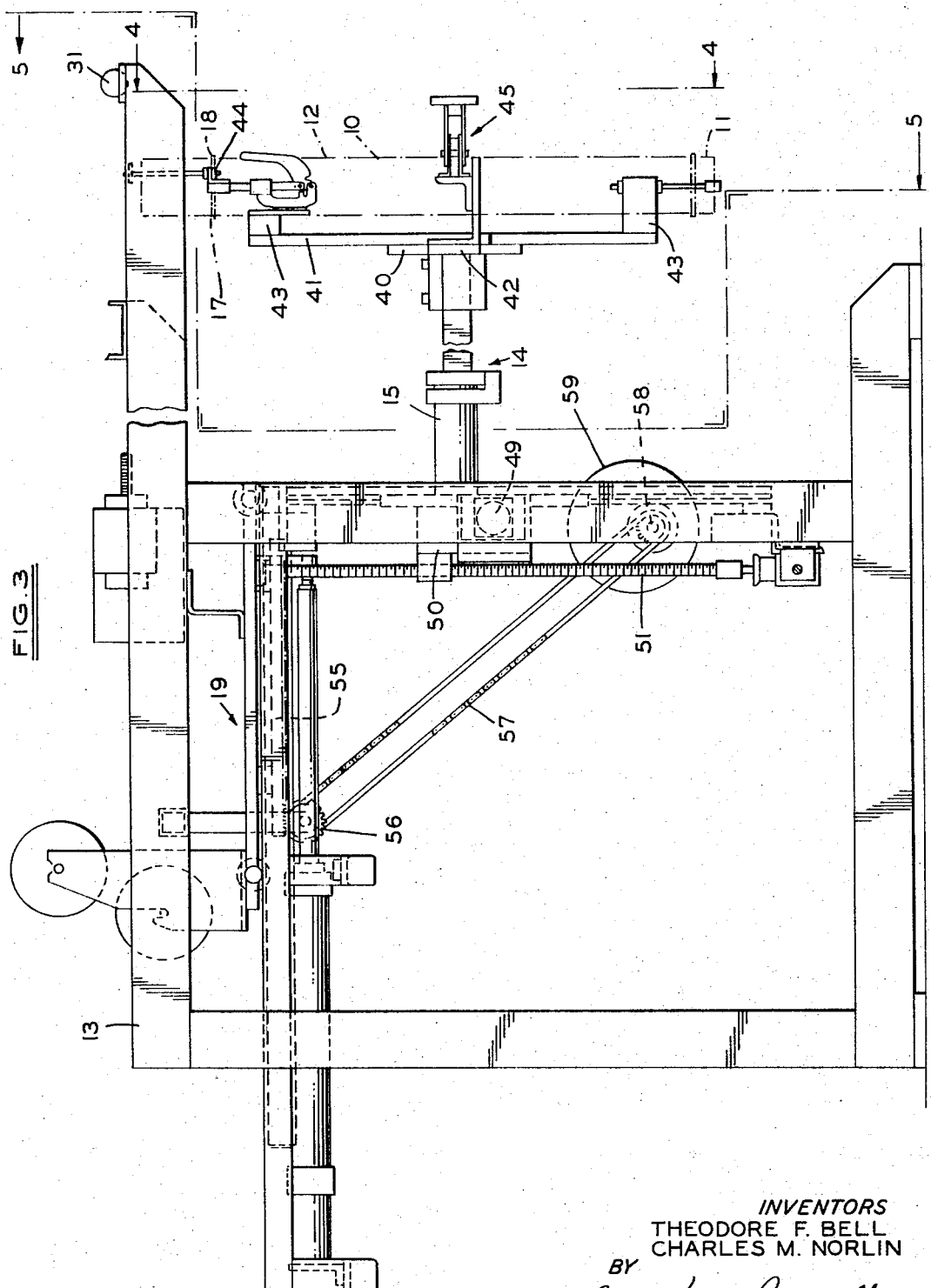
FIG. 3 is a fragmentary end view taken in the direction of the arrow 3 in FIG. 1.

Referring to FIGS. 3, 4 and 6, the plate 40 is, in turn, mounted on the shaft 15. The shaft 15 is journalled in the frame 13 and has a pinion 46 thereon engaging a rack 47 which, in turn, is mounted on the end of the piston 48 of a hydraulic cylinder 49 so that when the rack 47 is reciprocated, pinion 46 is rotated to rotate the work support 14 and bring different areas of the core into position for soldering.

The entire assembly of work support 14 is mounted on a support block 50 for vertical movement in the frame 13 (FIGS. 3, 4). As shown in FIG. 3, by rotation of the screw 51, which is journalled in the frame, the entire work support can be vertically adjusted relative to the frame 13. By this arrangement, the work support can be moved to position a radiator core of a different size for soldering.

As further shown in FIG. 3, each of the carriages 16, 19 has a gear rack 55 on the underside thereof which meshes with a gear 56. Rotation of the gear 56 causes a chain 57 to be moved. This, in turn, rotates the operating member 58 of a plurality of limit switches in a housing 59 that control the valves for operating the various cylinders of the carriages and the burners and the motors for operating of the solder feed mechanisms so that the operations occur in the proper timed relation. Referring to FIG. 7, the limit switches controlled by the timer operate solenoid operated valves 65, 66, 67 to which fluid is supplied by a conventional pump and filter system. Valve 65 is a four-way two position valve which supplies pressure to the opposite ends of the hydraulic motor 49 that rotates the workpiece. Valve 66 is a four-way single position spring return valve that supplies fluid to the opposite ends of the hydraulic motor 32' that controls the carriage 19. Similarly, valve 67 is a four-way single position spring return valve that supplies fluid to the opposite ends of the hydraulic motor 32 that controls the carriage 16. The lines to the opposite ends of the hydraulic motors 32, 32' are provided with one-way valves and also with solenoid controlled flow valves 68–71 which are operated by the timer to control the rate of movement of the carriages so that the carriages move rapidly to position for soldering or welding and thereafter slowly through the soldering or welding operation.

In order to provide for most rapid operation, a cooling blower 60 is supported on the first carriage 16 and is energized by one of the limit switches to direct cooling air through conduit 61 onto the radiator core as the carriage 16 is returning to its original position after soldering. Similarly, a blower 62 on the first carriage 16 directs air through a conduit 53 against the solder feed mechanisms 22 and associated parts to maintain these parts in relatively cool condition.

In operation, the operator positions a core 12 on the mounting mechanism 14 and clamps it in proper position by the use of the clamps 45. He then places the tank 10 in position on the core 12 and energizes the mechanism causing the first carriage 16 to move along its track. As the carriage approaches the core 12, flames are applied to the nozzles 23. This heats the areas of juncture 17, 18 of tank 10 and core 12. Substantially simultaneously solder is fed by the solder feed assembly 22 and is caused to flow into the heated areas of juncture. This continues until all the areas of juncture 17, 18 have been soldered and the carriage 16 is returned to its original position. During the movement, the cylinder 26' is actuated as may be needed to accommodate projections in the tank 10 or core 12.

The second carriage 19 is then automatically actuated to move along the side edges 20 and apply flames and solder thereto. The second carriage 19 is then returned to its original position whereupon the shaft 15 is rotated to bring the lower end of the core 12 into position whereupon the operator applies the tank 11 and the mechanism is actuated for another cycle to bring the first carriage 16 and the second carriage 19 successively in position to solder the second tank 11 on the core 12. The core 12 with the tanks 10, 11 thereon is then removed and another core is positioned for another operation.

It has been found that by moving the flames and solder feed mechanisms relative to the part, namely the radiator core, a more uniform soldering of the tanks to the core can be achieved. The use of hydraulic cylinders for moving the carriages results in a precise, accurate movement.

Although the invention has been particularly shown and described in connection with soldering apparatus, the apparatus can also be utilized for supporting welding apparatus and moving the welding apparatus toward and away from a workpiece which is supported on the base plate 40. Thus, the carriages can support M.I.G. or T.I.G. apparatus.

We claim:

1. An apparatus for joining parts such as the tanks and core of a radiator by soldering or the like comprising
    a frame,
    means on said frame for supporting a workpiece such as a radiator core for rotation about an axis,
    a first carriage on said frame,
    means for mounting and moving said first carriage on said frame in a direction generally perpendicular to said axis,
    a burner assembly mounted on said carriage for applying heat to predetermined portions of said workpiece,
    a solder feed assembly on said carriage for feeding solder to said predetermined portions of said workpiece,
    a second carriage on said frame,
    means for supporting and moving said second carriage on said frame for movement in a direction generally parallel to said axis of rotation of said workpiece,
    a second burner assembly on said second carriage for applying heat to second predetermined areas of said workpiece,
    a second solder feed assembly on said carriage for feeding solder to said second predetermined areas of said workpiece,
    and means for rotating said work support means about said axis thereby bringing further predetermined areas of said workpiece into position for application of heat and solder by said first and second carriages.

2. The combination set forth in claim 1 including means forming a part of each said burner assembly for moving said burners laterally as the carriage is moved to accommodate variations in the surfaces of the workpieces that are to be soldered.

3. The combination set forth in claim 1 wherein said means for supporting and moving said carriages includes a track on said frame.

4. The combination set forth in claim 1 wherein said means for rotating said work support means comprises
    a gear rack,
    means for translating said gear rack,
    a pinion,
    a shaft on said work support means,
    said pinion being fixed on said shaft and meshing with said rack whereby when said rack is reciprocated said pinion is rotated and said shaft is rotated.

5. The combination set forth in claim 1 wherein each said work support means comprises a plurality of supporting brackets which are adjustable relative to one another.

6. The combination set forth in claim 1 including means for adjusting the position of said work support means vertically of said frame.

7. An apparatus for joining parts such as the tanks and core of a radiator by soldering or the like comprising
    a frame,
    means on said frame for supporting a workpiece such as a radiator core for rotation about an axis,
    a first carriage,
    a first track on said frame on which said first carriage is mounted for reciprocating movement,
    means for moving said first carriage on said track in a direction generally perpendicular to said axis,
    a burner assembly mounted on said carriage for applying heat to predetermined portions of said workpiece,
    a solder feed assembly on said carriage for feeding solder to said predetermined portions of said workpiece,
    a second carriage,
    a second track on said frame on which said second carriage is mounted for reciprocating movement,
    means for supporting and moving said second carriage on said frame for movement in a direction generally parallel to said axis of rotation of said workpiece,
    a second burner assembly on said second carriage for applying heat to second predetermined areas of said workpiece,
    a second solder feed assembly on said carriage for feeding solder to said second predetermined areas of said workpiece, and means for rotating said work support means about said axis thereby bringing further predetermined areas of said workpiece into position for application of heat and solder by said first and second carriages.

8. The combination set forth in claim 7 wherein said burner assembly comprises a pair of burner headers, and means for moving said burner headers toward and away from one another as the carriage is moved to accommodate variations in the surfaces of the workpieces that are to be soldered.

9. The combination set forth in claim 7 wherein said means for rotating said work support means comprises a gear rack, means for translating said gear rack on said frame, a pinion, a shaft on said work support means, said pinion being fixed on said shaft and engaging said rack whereby when said rack is reciprocated said pinion is rotated and said shaft is rotated.

10. The combination set forth in claim 7 wherein said work support means comprises a plurality of supporting brackets which are adjustable relative to one another.

11. The combination set forth in claim 7 including means for adjusting the position of said work support means vertically of said frame.

12. An apparatus for joining parts such as the tanks and core of a radiator by soldering or the like comprising a frame, means on said frame for supporting a workpiece such as a radiator core for rotation about an axis, a carriage on said frame, means for mounting and moving said carriage on said frame in a direction generally perpendicular to said axis, a burner assembly mounted on said carriage for applying heat to predetermined portions of said workpiece, a solder feed assembly on said carriage for feeding solder to said predetermined portions of said workpiece, and means for rotating said work support means about said axis thereby bringing further predetermined areas of said workpiece into position for application of heat and solder by said carriage.

13. The combination set forth in claim 12 including means forming a part of each said burner assembly for moving said burners laterally as the carriage is moved to accommodate variations in the surfaces of the workpieces that are to be soldered.

14. The combination set forth in claim 13 wherein said means for supporting and moving said carriage includes a track on said frame.

15. The combination set forth in claim 13 wherein said means for rotating said work support means comprises a gear rack, means for translating said gear rack, a pinion, a shaft on said work support means, said pinion being fixed on said shaft and meshing with said rack whereby when said rack is reciprocated said pinion is rotated and said shaft is rotated.

16. An apparatus for joining parts such as the tanks and core of a radiator by soldering or the like comprising a frame, means on said frame for supporting a workpiece such as a radiator core for rotation about an axis, a first carriage on said frame, means for mounting and moving said first carriage on said frame in a direction generally perpendicular to said axis, a joining assembly on said carriage for feeding solder to said predetermined portions of said workpiece, a second carriage on said frame, means for supporting and moving said second carriage on said frame for movement in a direction generally parallel to said axis of rotation of said workpiece, a second joining assembly on said carriage for feeding solder to said second predetermined areas of said workpiece, and means for rotating said work support means about said axis thereby bringing further predetermined areas of said workpiece into position for joining by said first and second carriages.

No references cited.

RICHARD H. EANES, JR., *Primary Examiner.*